US012456938B2

(12) United States Patent
Horvát

(10) Patent No.: US 12,456,938 B2
(45) Date of Patent: Oct. 28, 2025

(54) BRUSHLESS PERMANENT MAGNET MOTOR

(71) Applicant: Dyson Technology Limited, Wiltshire (GB)

(72) Inventor: Máté Horvát, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 146 days.

(21) Appl. No.: 18/278,384

(22) PCT Filed: Feb. 16, 2022

(86) PCT No.: PCT/GB2022/050414
§ 371 (c)(1),
(2) Date: Aug. 22, 2023

(87) PCT Pub. No.: WO2022/180365
PCT Pub. Date: Sep. 1, 2022

(65) Prior Publication Data
US 2024/0154549 A1    May 9, 2024

(30) Foreign Application Priority Data
Feb. 25, 2021    (GB) ..................................... 2102700

(51) Int. Cl.
*H02P 27/08*    (2006.01)
*H02P 6/15*    (2016.01)
(Continued)

(52) U.S. Cl.
CPC .............. *H02P 6/182* (2013.01); *H02P 6/153* (2016.02); *H02P 21/0003* (2013.01); *H02P 21/14* (2013.01)

(58) Field of Classification Search
CPC .......... H02P 21/14; H02P 6/182; H02P 6/153; H02P 29/50; H02P 27/08; H02P 21/0003
(Continued)

(56) References Cited

U.S. PATENT DOCUMENTS 5,099,408 A    3/1992   Chen et al.
2007/0152624 A1*  7/2007   Hamaoka ................ H02P 29/68
                                                              318/805

(Continued)

FOREIGN PATENT DOCUMENTS

JP    2000-201495 A    7/2000
JP    2008-278736 A    11/2008
(Continued)

OTHER PUBLICATIONS

Comprehensive Analysis and Experimental Validation, IEEE, vol. 35 No. 12 (Year: 2020).*
(Continued)

*Primary Examiner* — Gabriel Agared
(74) *Attorney, Agent, or Firm* — Tucker Ellis LLP; Michael G. Craig

(57) ABSTRACT

A brushless permanent magnet motor has a phase winding, an inverter for applying voltage vectors to the phase winding, and a controller for controlling the inverter. The inverter has a plurality of high side switches and a plurality of low side switches. The controller is configured to divide an electrical cycle of the motor into a first portion and a second portion different to the first portion, apply a first set of voltage vectors to the phase winding in the first portion of the electrical cycle, and apply a second set of voltage vectors to the phase winding in the second portion of the electrical cycle. The second set of voltage vectors is different to the first set of voltage vectors. The controller is configured to turn on a low side switch to apply each voltage vector of the (Continued)

first set of voltage vectors, and turn off all low side switches to apply a zero-voltage vector of the second set of voltage vectors.

19 Claims, 5 Drawing Sheets

(51) Int. Cl.
  *H02P 6/182*  (2016.01)
  *H02P 21/00*  (2016.01)
  *H02P 21/14*  (2016.01)
  *H02P 29/50*  (2016.01)

(58) Field of Classification Search
  USPC ..................................................... 318/400.35
  See application file for complete search history.

(56) References Cited

U.S. PATENT DOCUMENTS

| | | |
|---|---|---|
| 2008/0079377 A1 | 4/2008 | Williams et al. |
| 2011/0084640 A1* | 4/2011 | Brown .................... H02P 6/185 318/400.35 |
| 2013/0088905 A1 | 4/2013 | Lee et al. |
| 2013/0234631 A1* | 9/2013 | Bateman ................. H02P 6/185 318/400.01 |
| 2013/0234640 A1* | 9/2013 | Bateman ................. H02P 6/182 318/400.35 |
| 2016/0359442 A1* | 12/2016 | Zhao ....................... H02P 21/24 |
| 2018/0115254 A1 | 4/2018 | Qian |

FOREIGN PATENT DOCUMENTS

| | | |
|---|---|---|
| WO | 2020/213045 A1 | 10/2020 |
| WO | 2022/064188 A1 | 3/2022 |

OTHER PUBLICATIONS

International Search Report and Written Opinion received for PCT Patent Application No. PCT/GB2022/050414, mailed on May 11, 2022, 11 pages.
International Search Report and Written Opinion received for PCT Patent Application No. PCT/GB2022/050416, mailed on May 17, 2022, 11 pages.
Search Report received for GB Application No. 2102700.8, mailed on Aug. 13, 2021 1 page.
Search Report received for GB Application No. 2102702.4, mailed on Aug. 18, 2021, 1 page.
Wu et al., "Comprehensive Analysis and Experimental Validation of 240(degree)—Clamped Space Vector PWM Technique Eliminating Zero States for EV Traction Inverters With Dynamic DC Link," Institute of Electrical and Electronics Engineers (IEEE), vol. 35, Issue 12, Dec. 1, 2020, pp. 13295-13307.

\* cited by examiner

BRUSHLESS PERMANENT MAGNET MOTOR

CROSS-REFERENCE TO PRIOR APPLICATION

This application is a § 371 National Stage Application of PCT International Application No. PCT/GB2022/050414 filed Feb. 16, 2022, which claims the priority of United Kingdom Application No. 2102700.8, filed Feb. 25, 2021, each of which are herein incorporated by reference in their entirety.

FIELD OF THE INVENTION

The present invention relates to a brushless permanent magnet motor, and a method of controlling a brushless permanent magnet motor.

BACKGROUND OF THE INVENTION

The operational temperature of rotors in brushless permanent magnet motors is of concern for the mechanical integrity and magnetic performance of the permanent magnets located in the rotor assembly, as well as for the life expectancy of bearings of the motor. The operational temperature of the rotor is principally impacted by the amount of loss generated in the rotor, of which a significant amount is induced by time harmonic variation of the stator magnetic field. This is especially prevalent in sintered permanent magnets. The higher the RMS value of higher order phase current ripple, the higher the eddy currents induced in the rotor permanent magnets, and hence the higher the magnet temperature.

SUMMARY OF THE INVENTION

According to a first aspect of the present invention there is provided a brushless permanent magnet motor comprising a phase winding, an inverter for applying voltage vectors to the phase winding, and a controller for controlling the inverter, wherein the inverter comprises a plurality of high side switches and a plurality of low side switches, and the controller is configured to divide an electrical cycle of the motor into a first portion and a second portion different to the first portion, apply a first set of voltage vectors to the phase winding in the first portion of the electrical cycle, apply a second set of voltage vectors to the phase winding in the second portion of the electrical cycle, the second set of voltage vectors different to the first set of voltage vectors, turn on a low side switch to apply each voltage vector of the first set of voltage vectors, and turn off all low side switches to apply a zero-voltage vector of the second set of voltage vectors.

The brushless permanent magnet motor according to the first aspect of the present invention may be advantageous as the controller is configured to turn on a low side switch to apply each voltage vector of the first set of voltage vectors, and turn off all low side switches to apply a zero-voltage vector of the second set of voltage vectors. In particular, by turning on a low side switch to apply each voltage vector of the first set of voltage vectors, a low side switch is always on during the first portion of the electrical cycle, which may enable determination of a current value indicative of current flowing through the phase winding, for example by measuring a voltage across the low side switch. This may be beneficial for control schemes where, for example, such a current value is needed to determine a position of a rotor of the brushless permanent magnet motor.

Furthermore, as the controller is configured to turn off all low side switches to apply a zero-voltage vector of the second set of voltage vectors, the second set of voltage vectors includes a voltage vector that is not present in the first set of voltage vectors, and hence may allow for increased flexibility of control in the second portion of the electrical cycle, for example where determination of a current value indicative of current flowing through the phase winding is not needed to determine a position of a rotor of the brushless permanent magnet motor.

The controller may be configured to turn on the same low side switch to apply each voltage vector of the first set of voltage vectors. This may enable use of only a single current monitor to determine a current value indicative of current flowing through the phase winding.

The controller may be configured to turn all high side switches on to apply the zero-voltage vector of the second set of voltage vectors. A zero-voltage vector obtained by turning all low side switches off and all high side switches on may be absent from the first set of voltage vectors.

The controller may be configured to turn on all low side switches to apply a zero-voltage vector of the first set of voltage vectors. The controller may be configured to turn on all low side switches to apply a further zero-voltage vector of the second set of voltage vectors. Use of two zero-voltage vectors in the second portion of the electrical cycle may provide greater control over current flowing through the phase winding in the second portion of the electrical cycle, for example enabling peak to peak current ripple to be reduced by application of two different zero-voltage vectors in the same portion of the electrical cycle. A reduction in peak to peak current ripple may reduce eddy currents induced in the rotor, which may result in reduced rotor temperature rise compared to the first portion of the electrical cycle where only a single zero-voltage vector can be applied.

The second set of voltage vectors may comprise more voltage vectors than the first set of voltage vectors. This may mean that, measured over an equal sized portion of the electrical cycle, the effective switching frequency during application of the second set of voltage vectors is greater than the effective switching frequency during application of the first set of voltage vectors. Thus by using a combination of the first and second sets voltage vectors during the electrical cycle, a greater effective switching frequency may be achieved compared to use of the first set of voltage vectors alone during the electrical cycle. A greater effective switching frequency may reduce peak to peak current ripple, and hence may result in reduced rotor temperature rise.

The controller may be configured to apply the first set of voltage vectors in a first sequence and to apply the second set of voltage vectors in a second sequence, the first sequence comprising a non-zero voltage vector applied at a mid-point of the first sequence, and the second sequence comprising the zero-voltage vector applied at a mid-point of the second sequence. In such a manner the peak to peak current ripple may be reduced in the second portion of the electrical cycle compared to that in the first portion of the electrical cycle, and a reduced rotor temperature rise may be achieved compared to a control scheme that utilises the first set of voltage vectors for the full electrical cycle.

The first and second sequences may be repeated through their respective first and second portions of the electrical cycle, for example with multiple applications of the first sequence in the first portion of the electrical cycle and multiple applications of the second sequence in the second portion of the electrical cycle. Adjacent voltage vectors in the first and second sequences may vary by only a single switch state, for example with a single switch turned on or off to move between adjacent voltage vectors in the first and second sequences. The first and second sequences may be symmetrical about their respective mid-points.

The brushless permanent magnet motor may comprise a three-phase brushless permanent magnet motor having three phase windings, and the inverter may comprise a three-phase inverter having three high side switches and three low side switches.

The controller may employ five-step space vector pulse width modulation to apply the first set of voltage vectors in the first portion of the electrical cycle, and may employ seven-step space vector pulse width modulation to apply the second set of voltage vectors in the second portion of the electrical cycle. Five-step space vector pulse width modulation may comprise application of a sequence of five voltage vectors during one switching cycle, for example with four switching events occurring to apply the five voltage vectors. The sequence of five voltage vectors applied may comprise repeated voltage vectors, for example with the same voltage vector being applied more than once in the sequence. Seven-step space vector pulse width modulation may comprise application of a sequence of seven voltage vectors during one switching cycle, for example with six switching events occurring to apply the seven voltage vectors. The sequence of seven voltage vectors applied may comprise repeated voltage vectors, for example with the same voltage vector being applied more than once in the sequence.

The first portion of the electrical cycle may comprise 120 degree of the electrical cycle, and the second portion of the electrical cycle may comprise 240 degrees of the electrical cycle. Thus determination of the current value indicative of current flowing through the phase winding may be available in the first portion of the electrical cycle, with the second, greater, portion of the electrical cycle enabling greater control to reduce the peak to peak current ripple relative to that of the first portion of the electrical cycle.

The brushless permanent magnet motor may comprise a resistor connected in series with the low side switch turned on to apply each voltage vector of the first set of voltage vectors, and the controller may be configured to monitor the voltage across the resistor in the first portion of the electrical cycle, and to determine a current value indicative of current flowing through the phase winding in the first portion of the electrical cycle using the monitored voltage. This may provide a simple mechanism for determining the current value indicative of current flowing through the phase winding in the first portion of the electrical cycle.

The controller may be configured to estimate a position of a rotor of the brushless permanent magnet motor using the determined current value indicative of current flowing through the phase winding in the first portion of the electrical cycle.

The controller may be configured to obtain a reference voltage value indicative of a voltage applied to the phase winding of the motor, calculate a phase of back EMF induced in the phase winding using the determined current value and the reference voltage value, determine a zero-crossing point of the back EMF induced in the phase winding using the calculated phase of back EMF induced in the phase winding, and generate a rotor position signal based on the determined zero-crossing point.

The back EMF of a brushless permanent magnet motor may have a substantially sinusoidal form, and it may be possible to obtain an amplitude and a frequency of back EMF induced in the phase winding from past measurement or simulation, or from real-time calculation. By calculating a phase of back EMF induced in the phase winding using the measured current value and the reference voltage value, this information can then be used in conjunction with the known amplitude and frequency to provide a relatively accurate representation of a waveform of the back EMF induced in the phase winding. The representation of a waveform of the back EMF induced in the phase winding may then be used to determine a zero-crossing point of the back EMF induced in the phase winding, and hence to generate a rotor position signal.

By a zero-crossing point of back EMF induced in the phase winding is meant a point at which the value of the back EMF hits zero during a transition between a positive polarity back EMF value and a negative polarity back EMF value, or vice versa.

The controller may be configured to determine an aligned position of a rotor of the brushless permanent magnet motor when the back EMF induced in the phase winding is at the zero-crossing point. By an aligned position is meant a position at which the rotor is aligned between two opposing magnetic poles defined by the motor, for example a position at which a permanent magnet attached to the rotor is aligned between two opposing magnetic poles defined by a stator of the motor.

The controller may be configured to determine a rotor position of 0 electrical degrees when the back EMF induced in the phase winding is at the zero-crossing point.

The phase of back EMF induced in the phase winding may be calculated using the equation:

$$-E_{phX} \propto I_{phX} R_{phX} + (L_{selfphX} - L_{mutualphX}) \frac{dI_{phX}}{dt} - V_{phX};$$

where $E_{phX}$ is the back EMF induced in the phase winding X, $L_{selfphX}$ is the self-inductance of the phase winding X, $L_{mutualphX}$ is the s mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

Determining a zero-crossing point of the back EMF induced in the phase winding using the calculated phase of back EMF induced in the phase winding may comprise determining a past zero-crossing point of the back EMF induced in the phase winding, and generating a rotor position signal based on the determined zero-crossing point may comprise generating a rotor position signal based on the past zero-crossing point.

Determining a zero-crossing point of the back EMF induced in the phase winding using the calculated phase of back EMF induced in the phase winding may comprise determining a future zero-crossing point of the back EMF induced in the phase winding, and generating a rotor position signal based on the determined zero-crossing point may comprise generating a rotor position signal based on the future zero-crossing point.

Generating a rotor position signal based on the determined zero-crossing point may comprise updating a pre-existing rotor position signal based on the determined zero-crossing point.

Determining an aligned position of the rotor of the brushless permanent magnet motor when the back EMF induced in the phase winding is at the zero-crossing point may comprise determining a past aligned position of the rotor when the back EMF is at a past zero-crossing point. For example, determining a zero-crossing point of the back EMF induced in the phase winding using the calculated phase of back EMF induced in the phase winding may comprise determining a past zero-crossing point of the back EMF induced in the phase winding. This may allow a rotor position signal provided to a controller of the brushless permanent magnet motor to be updated after a determination of the past zero-crossing point has been made.

Determining an aligned position of the rotor of the brushless permanent magnet motor when the back EMF induced in the phase winding is at the zero-crossing point may comprise determining a future aligned position of the rotor when the back EMF is at a future zero-crossing point. For example, determining a zero-crossing point of the back EMF induced in the phase winding using the calculated phase of back EMF induced in the phase winding may comprise determining a future zero-crossing point of the back EMF induced in the phase winding.

The back EMF induced in the phase winding may comprise a sinusoidal waveform, for example having an amplitude and a frequency. Determining a zero-crossing point of the back EMF induced in the phase winding may comprise utilising any or any combination of a calculated phase of back EMF induced in the phase winding, an amplitude representative of the amplitude of back EMF induced in the phase winding, and a frequency representative of the frequency of back EMF induced in the phase winding.

An amplitude representative of the amplitude of back EMF induced in the phase winding may comprise a pre-determined amplitude, and/or a frequency representative of the frequency of back EMF induced in the phase winding may comprise a pre-determined frequency. For example, a pre-determined amplitude and/or a pre-determined frequency may be obtained by prior measurement or simulation, and may be stored in memory of a controller of the brushless permanent magnet motor. An amplitude representative of the amplitude of back EMF induced in the phase winding may comprise a calculated amplitude, for example calculated in real time, and/or a frequency representative of the frequency of back EMF induced in the phase winding may comprise a calculated frequency, for example calculated in real time. The amplitude representative of the amplitude of back EMF induced in the phase winding, and/or the frequency representative of the frequency of back EMF induced in the phase winding may be speed-dependent. For example, a higher speed of rotation of the rotor of the brushless permanent magnet motor may result in a larger amplitude and/or frequency.

Calculating a phase of back EMF induced in the phase winding may comprise integrating the equation:

$$-E_{phX} \propto I_{phX} R_{phX} + (L_{selfphX} - L_{mutualphX}) \frac{dI_{phX}}{dt} - V_{phX};$$

to obtain a relationship representative of integrated back EMF.

Calculating a phase of back EMF induced in the phase winding may comprise equating integrated back EMF to an integral of a sinusoidal waveform representative of back EMF induced in the phase winding.

The controller may be configured to utilise a determined zero-crossing point of back EMF induced in the phase winding to calculate an electrical period of the rotor. The controller may be configured to utilise a determined zero-crossing point of back EMF induced in the phase winding to calculate a speed of the rotor. The controller may be configured to utilise a determined zero-crossing point of back EMF induced in the phase winding to generate a signal representing continuous position of the rotor.

According to a second aspect of the present invention there is provided a method of controlling a brushless permanent magnet motor comprising a phase winding and an inverter for applying voltage vectors to the phase winding, the inverter comprising a plurality of high side switches and a plurality of low side switches, wherein the method comprises dividing an electrical cycle of the motor into a first portion and a second portion different to the first portion, applying a first set of voltage vectors to the phase winding in the first portion, applying a second set of voltage vectors to the phase winding in the second portion, the second set of voltage vectors different to the first set of voltage vectors, turning on a low side switch to apply each voltage vector of the first set of voltage vectors, and turning off all low side switches to apply at least one voltage vector of the second set of voltage vectors.

According to a third aspect of the present invention there is provided a data carrier comprising machine readable instructions for the operation of a controller of a brushless permanent magnet motor to divide an electrical cycle of the motor into a first portion and a second portion different to the first portion, apply a first set of voltage vectors to a phase winding of the motor in the first portion, apply a second set of voltage vectors to the phase winding in the second portion, the second set of voltage vectors different to the first set of voltage vectors, turn on a low side switch to apply each voltage vector of the first set of voltage vectors, and turn off all low side switches to apply at least one voltage vector of the second set of voltage vectors.

Optional features of aspects of the present invention may be equally applied to other aspects of the invention, where appropriate.

DETAILED DESCRIPTION OF THE INVENTION

Figure 1:
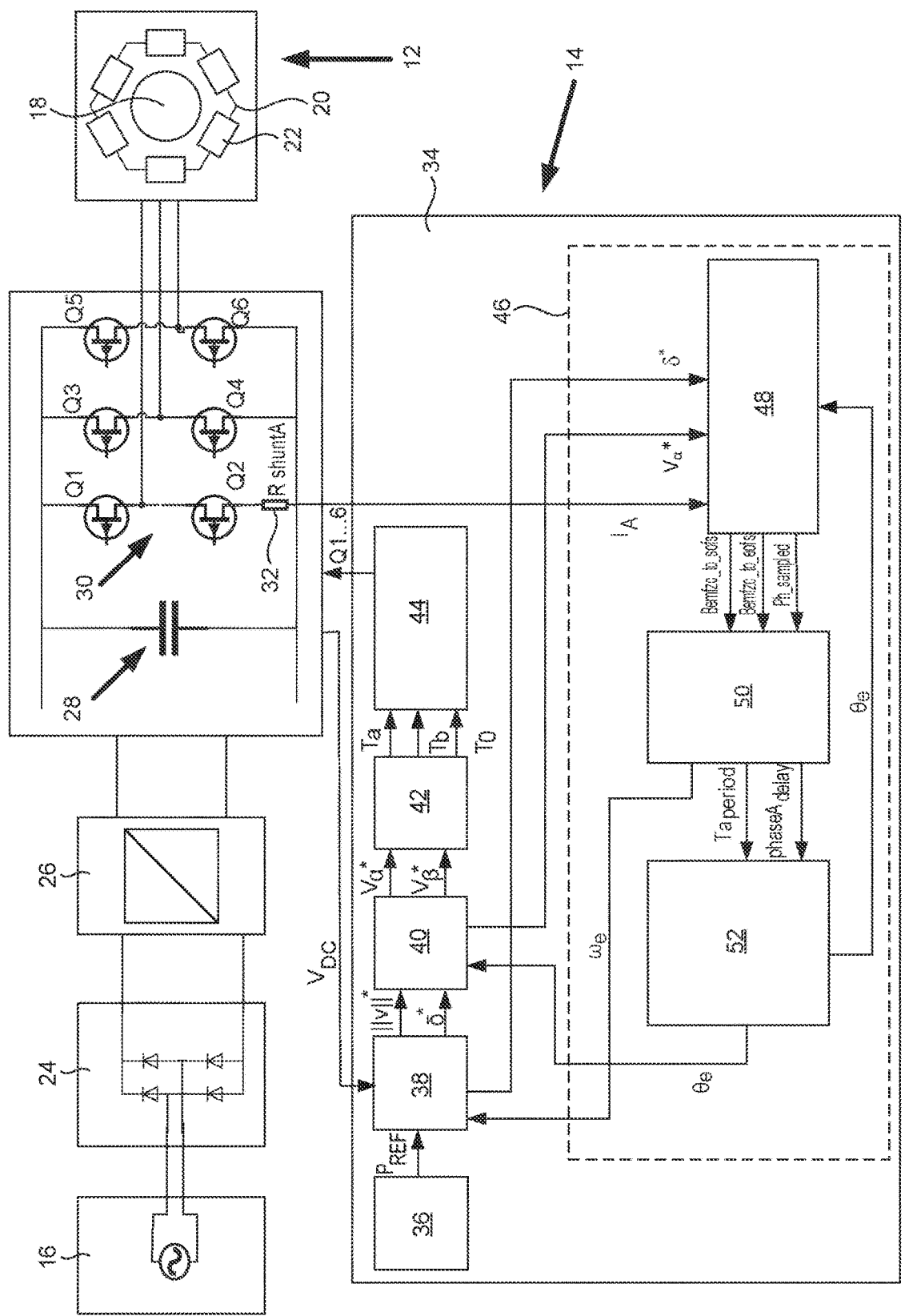
FIG. 1 is a schematic diagram illustrating a first embodiment of a motor system according to the present invention.

A brushless permanent magnet motor 12 is illustrated schematically in FIG. 1, and includes a control system 14.

As shown in FIG. 1, the motor 12 is powered by an AC mains power supply 16, although it will be appreciated that embodiments where the motor 12 is powered by a battery are also envisaged with appropriate modification to the control system 14.

The motor 12 comprises a two-pole permanent magnet rotor 18 that rotates relative to a stator 20 having six coils. It will be appreciated by a person skilled in the art that the teachings referred to herein will be generally applicable to motors having different number of rotor poles and stator coils. Conductive wires are wound about the stator 20 to form three phase windings 22 connected in either of a so-called "star configuration", ie with the three phase windings 22 coupled together with a common neutral node, or in a so-called "delta configuration", ie with an end of one winding couple to a beginning of another winding or vice versa. The three phase windings 22 will be referred to herein as phase A, phase B, and phase C, although it will be appreciated that other notation, for example U, V, W, may also be used.

The control system 14 comprises a rectifier 24, a DC-DC boost converter 26, a DC link filter 28, an inverter 30, a current sensor 32, and a controller 34.

The rectifier 24 is a full-wave bridge of diodes that rectifies the output of the AC mains power supply 12 to provide a DC link voltage.

The DC-DC boost converter 26 is any appropriate boost converter that boosts the DC link voltage and supplies the boosted DC link voltage to the inverter 30. In some embodiments it will be appreciated that the DC-DC boost converter may be omitted.

The DC link filter 28 comprises a capacitor that smooths the relatively high frequency ripple that arises from switching of the inverter 30.

The inverter 30 comprises a full bridge of six power switches Q1-Q6 that couple the DC link voltage to the phase windings 22. The power switches Q1-Q6 are controlled in response to signals provided by the controller 34, as will be described in more detail hereafter. The power switches Q1, Q3 and Q5 are high side switches, and the power switches Q2, Q4 and Q6 are low side switches. Pairs of high and low side switches define legs of the inverter 30, for example with pairs Q1 and Q2, Q3 and Q4, and Q5 and Q6 each defining a leg of the inverter 30 in FIG. 1.

The current sensor 32 in FIG. 1 comprises a shunt resistor $R_{shuntA}$ located on a low side of leg A of the inverter 30 corresponding to the switches Q1 and Q2.

The controller 34 controls operation of the power switches Q1-Q6 of the inverter 30 in a manner that will be described in further detail below. The controller 34 comprises a microcontroller having a processor, a memory device, and a plurality of peripherals (for example ADC, comparators, timers etc). The memory device stores instructions for execution by the processor, as well as control parameters for use by the processor.

As seen in FIG. 1, the controller 34 operates a plurality of control blocks to control the motor 12. Whilst shown in FIG. 1 as control blocks forming part of the controller 34, it will be appreciated that embodiments where the control blocks are stored and/or run on separate components to the controller 34 are also envisaged.

The control blocks of FIG. 1 comprise a power lookup table 36, a 3D lookup table 38, a voltage reference generator 40, a switching timing generator 42, a switching controller 44, and a rotor position calculator 46.

The motor 12 of FIG. 1 is controlled to obtain a desired power, and so the controller 34 obtains a reference power $P_{REF}$ from the power lookup table 36. The reference power $P_{REF}$, along with an estimated speed of the rotor $\omega_e$, the calculation of which will be described hereinafter, and a DC link voltage $V_{DC}$, are used to index the 3D lookup table 38 to obtain a desired voltage magnitude $\|v\|^*$ and a desired voltage phase $\delta^*$.

The desired voltage magnitude $\|v\|^*$ and the desired voltage phase $\delta^*$ are passed to the voltage reference generator 40, along with an estimated rotor position signal $\theta_e$, the calculation of which will be discussed hereafter, and the DC link voltage $V_{DC}$. The voltage reference generator 40 generates an orthogonal representation on α-β axes of the voltages to be applied to each of the three phase windings 22, with the orthogonal voltages denoted $v_\alpha^*$ and $v_\beta^*$. The orthogonal voltages $v_\alpha^*$ and $v_\beta^*$ are calculated as shown below:

$$v_\alpha^* = \frac{\|v\|^* \cdot \sin\left(\theta_e + \delta^* - \pi + \frac{T_s}{2} \cdot \omega_e\right)}{V_{DC}}$$

$$v_\beta^* = \frac{\|v\|^* \cdot \sin\left(\theta_e + \delta^* - \frac{3\pi}{2} + \frac{T_s}{2} \cdot \omega_e\right)}{V_{DC}}$$

where $\|v\|^*$ is the desired voltage magnitude, $\theta_e$ is the estimated rotor position signal, $\delta^*$ is the desired phase voltage, $T_s$ is $1/f_{sw}$ with $f_{sw}$ being the sampling frequency, and $\omega_e$ is the estimated speed of the rotor.

The orthogonal voltages $v_\alpha^*$ and $v_\beta^*$ are passed to the switching timing generator 42, which is configured to generate switching timings $T_a$, $T_b$, $T_0$ according to a space vector pulse width modulation method.

The switching timings $T_a$, $T_b$, $T_0$ have the following relationship:

$$T_0 = T_s - T_a - T_b$$

The switching timings $T_a$ and $T_b$ are calculated using the following relationships:

$$vREF_{position} = \theta_e + (\delta^* - \frac{3}{2}\pi + (\frac{T_s}{2} \cdot \omega_e))$$

$$m = \|v\|^* \frac{\sqrt{3}}{V_{DC}}$$

with the calculation dependent on the value of $vREF_{position}$ as indicated in Table 1 below.

TABLE 1

| $vREF_{position}$ | Switch Timings |
|---|---|
| $\ldots < \frac{\pi}{3}$ | $T_a = m \cdot \sin\left(\frac{\pi}{3} - vREF_{position}\right) \cdot T_s$ |
| | $T_b = m \cdot \sin(vREF_{position}) \cdot T_s$ |
| $\frac{\pi}{3} \leq \ldots < \frac{2\pi}{3}$ | $T_a = m \cdot \sin\left(vREF_{position} - \frac{\pi}{3}\right) \cdot T_s$ |
| | $T_b = m \cdot \sin\left(\frac{2\pi}{3} - vREF_{position}\right) \cdot T_s$ |
| $\frac{2\pi}{3} \leq \ldots < \pi$ | $T_a = m \cdot \sin(\pi - vREF_{position}) \cdot T_s$ |

TABLE 1-continued

| vREF$_{position}$ | Switch Timings |
|---|---|
| | $T_b = m \cdot \sin\left(vREF_{position} - \frac{2\pi}{3}\right) \cdot T_s$ |
| $\pi \leq \ldots < \frac{4\pi}{3}$ | $T_a = m \cdot \sin(vREF_{position} - \pi) \cdot T_s$ |
| | $T_b = m \cdot \sin\left(\frac{4\pi}{3} - vREF_{position}\right) \cdot T_s$ |
| $\frac{4\pi}{3} \leq \ldots < \frac{5\pi}{3}$ | $T_a = m \cdot \sin\left(\frac{5\pi}{3} - vREF_{position}\right) \cdot T_s$ |
| | $T_b = m \cdot \sin\left(vREF_{position} - \frac{4\pi}{3}\right) \cdot T_s$ |
| $\frac{5\pi}{3} \leq \ldots < 2\pi$ | $T_a = m \cdot \sin\left(vREF_{position} - \frac{5\pi}{3}\right) \cdot T_s$ |
| | $T_b = m \cdot \sin(-vREF_{position}) \cdot T_s$ |

The values of the switch timings $T_a$, $T_b$, $T_0$ are passed to the switching controller 44, which controls the six power switches Q1-Q6 of the inverter 30 using space vector pulse width modulation based on the switching timings $T_a$, $T_b$, $T_0$.

The details of the space vector pulse width modulation techniques used will be described in more detail hereafter, but for now it is sufficient to say that the controller 34 is able to control switching of the six power switches Q1-Q6 such that appropriate voltages are applied to drive rotation of the rotor 18.

It will be appreciated from the discussion above that in order to control rotation of the rotor 18, knowledge of the rotor position and rotor speed is needed. As will now be discussed, the controller 34 employs a sensorless scheme for estimating position and speed of the rotor 18, and controls operation of the power switches Q1-Q6 of the inverter 30 in response to the estimated position and speed of the rotor 18.

To employ the sensorless scheme, as shown in FIG. 1, the controller 34 comprises the rotor position calculator 46. The rotor position calculator 46 includes a zero-crossing estimator 48, an electrical period calculator 50, and a position signal generator 52.

In the embodiment of FIG. 1, only values relating to phase winding A are utilised, although it will be appreciated that the following discussion could equally apply to phase winding B or phase winding C.

In the absence of any significant saturation or saliency, the voltage equation for any of the phase windings 22 may be expressed as $$-E_{phX} = I_{phX} R_{phX} + (L_{selfphX} - L_{mutualphX})\frac{dI_{phX}}{dt} - V_{phX}$$

where $E_{phX}$ is the back EMF induced in the phase winding X, $L_{selfphX}$ is the self-inductance of the phase winding X, $L_{mutualphX}$ is the s mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

The zero-crossing estimator 48 uses this voltage equation to estimate zero-crossings of back EMF in phase winding A, as will now be described.

The zero-crossing estimator 48 receives a signal, $I_A$, representing a current value indicative of current flowing through phase winding A, from the shunt resistor $R_{shuntA}$. The zero-crossing estimator 48 also receives the desired voltage phase $\delta^*$ from the 3D lookup table 38, and the orthogonal voltage $v^*_\alpha$ from the voltage reference generator. In the orthogonal representation on $\alpha$-$\beta$ axes of the voltages to be applied to each of the three phase windings, the orthogonal voltage $v^*_\alpha$ corresponds to the voltage applied to phase winding A, and so $v^*_\alpha$ may be taken as reference voltage value indicative of a voltage applied to phase winding A without further manipulation. Where phase windings B and/or C are utilised, further manipulation of the orthogonal voltages $v^*_\alpha$ and $v^*_\beta$ may be required to obtain reference voltage values indicative of the voltages applied to phase winding B or C.

The zero-crossing estimator 48 further receives a previously estimated rotor position signal $\theta_e$ from the position signal generator 52. This enables the rotor position signal to be updated based on the outputs from the zero-crossing estimator 48.

Using the self-inductance, $L_{selfphA}$, the mutual inductance of the phase winding A with other phase windings of the motor $L_{mutualphA}$, and the resistance, $R_{phA}$, of the phase winding A, which are known quantities, in combination with the signal, $I_A$, which is the current value indicative of current flowing through the phase winding A, and the orthogonal voltage $v^*_\alpha$ which is the reference voltage value indicative of the voltage applied to the phase winding A, the zero-crossing estimator 48 is able to determine zero-crossing points of back EMF induced in the phase winding A in the following manner.

Integrating the voltage equation gives the relationship representative of integrated back EMF below:

$$\int_{-a}^{a} -E(t)dt = R\int_{-a}^{a} I_A(t)dt + L_{self}(I_A(a) - I_A(-a)) - L_{mutual}(I_A(a) - I_A(-a)) - \int_{-a}^{a} v^*_\alpha(t)dt$$

where $-a$ and $a$ are boundary values at the beginning and end of a measurement interval. This value is denoted as Bemf$_{integ}$.

The back EMF induced in the phase winding 22 can also be fairly accurately approximated by a sinusoidal waveform having the following equation:

$$E(t) = A\sin(\omega t - \varphi) + \text{noise}(t)$$

where E(t) is the back EMF, A is the amplitude of the back EMF, $\omega$ is the angular frequency of the back EMF in radians per second, and $\varphi$ is the phase of the back EMF in radians. Noise(t) represents any noise present in the back EMF signal. The integral of the noise component of the back EMF equation approximates to zero, and hence can effectively be ignored.

If we let Fs be the sampling frequency over a measurement interval from $-h$ to h, we let s be the time in samples, and t be the time in seconds, such that s=Fst, then the value Bemf$_{integ\_norm}$, can also be written as the estimated integral of the sinusoidal back EMF waveform on the interval [$-h$, h] in samples:

$$Bemf_{integ} = \int_{-h}^{h} E(s)ds = \int_{-h}^{h} A\sin\left(\omega \frac{s}{F_s} - \varphi\right)ds$$

If we substitute s=(Fs/ω)x, then we get:

$$Bemf_{integ} = \int_{-h\frac{\omega}{F_s}}^{h\frac{\omega}{F_s}} A\sin(x-\varphi)\frac{F_s}{\omega}dx = A\frac{F_s}{\omega}\int_{-h\frac{\omega}{F_s}}^{h\frac{\omega}{F_s}} \sin(x-\varphi)dx \qquad 5$$

It can be seen that a normalisation constant for the integral given above is A·(Fs/ω), where Fs is the sampling frequency. It can also be observed that the integration limit $$h\frac{\omega}{F_S}$$

is half of the measurement interval expressed as the angle of back EMF in radians.

The amplitude, A, depends linearly on the motor speed and is commonly expressed via the motor-specific constant $M_{100K}$, which is the amplitude in volts at the speed of 100,000 RPM. This constant depends on the motor construction, varies slightly with temperature, and can be determined by characterisation during a resynchronisation phase of the motor 12. The amplitude is thus given by:

$$A = M \cdot 10^3 \frac{f_{RPM}}{10^5} = M\frac{10^3 \cdot 60 \cdot f}{pp \cdot 10^5}$$

where $f_{RPM}$ is the motor speed in RPM, and pp is the pole pair number of the rotor (in the present case 1).

The normalisation constant for the integral of the back EMF therefore becomes:

$$A\frac{F_s}{\omega} = A\frac{F_s}{2\pi f} = M\frac{10^3 \cdot 60 \cdot F_s}{2\pi \cdot pp \cdot 10^5}$$

The expression $(60Fs)/(pp \cdot 10^5)$ equals the number of samples per electrical period at 100,000 RPM for a four-pole motor, i.e. at the speed for which the M constant is specified. This can be thought of as the frequency normalisation factor, whereas $M \cdot 10^3$ can be thought of as the amplitude normalisation factor.

Thus it can be seen from that for known values amplitude and frequency of back EMF, we can calculate the phase of the back EMF induced in the phase winding using the following relationship:

$$\sin\varphi = \frac{A\frac{F_s}{\omega}\int_{-h\frac{\omega}{F_s}}^{h\frac{\omega}{F_s}} \sin(x-\varphi)dx}{2\sin(h\frac{\omega}{F_s})}$$

for unit amplitude, and a period of 2 π.

From the integration of the back EMF equation above, we know that:

$$\sin\varphi = \frac{A\frac{F_s}{\omega}\int_{-h\frac{\omega}{F_s}}^{h\frac{\omega}{F_s}}\sin(x-\varphi)dx}{2\sin(h\frac{\omega}{F_s})} = \frac{R\int_{-a}^{a}I_A(t)dt + L_{self}(I_A(a) - I_A(-a)) - L_{mutual}(I_A(a) - I_A(-a)) - \int_{-a}^{a}v_\alpha^*(t)dt}{2\sin(h\frac{\omega}{F_s})}$$

Then by utilising the values for the current value indicative of current flowing through the phase winding, the reference voltage value indicative of the voltage applied to the phase winding, and converting the argument of the denominator into radians, we can determine a value for sin φ. The phase, φ, is then obtained by applying the arcsin function.

Once the phase has been calculated, known amplitude and/or frequency values stored in memory for the given rotor speed, or indeed calculated amplitude and/or frequency values for the given rotor speed, can be used in combination with the phase to determine zero-crossing points of back EMF induced in the phase winding 22, for example using a representation of the back EMF waveform.

Figure 2:
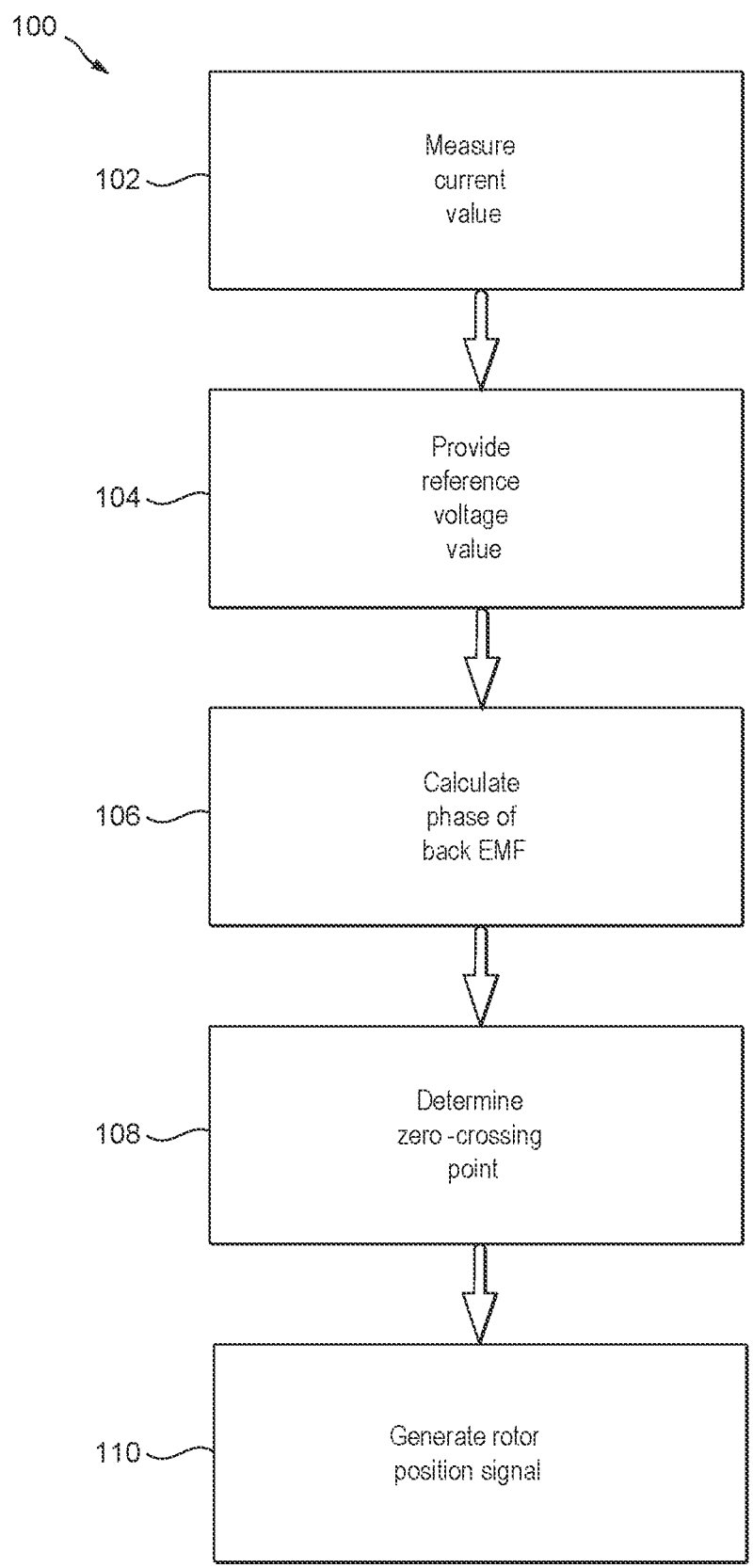
FIG. 2 is a flow diagram illustrating a method of controlling the motor system of FIG. 1.

A method 100 of determining the position of the rotor 18 is illustrated in the flow diagram of FIG. 2.

The method 100 comprises measuring 102 a current value indicative of current flowing through the phase winding A, and providing 104 a reference voltage value indicative of a voltage applied to the phase winding A. The method 100 comprises calculating 106 a phase of back EMF induced in the phase winding A using the measured current value and the reference voltage value, and determining 108 a zero-crossing point of the back EMF induced in the phase winding using the calculated phase of back EMF induced in the phase winding. The method comprises and using 110 the calculated phase of back EMF induced in the phase winding to generate a rotor position signal.

Knowledge of the zero-crossing points of back EMF induced in the phase winding 22 allows calculation of various values which can be used by the electrical period calculator 50, and the position signal generator 52 to generate the estimated rotor position signal $\theta_e$. In particular, the zero-crossing estimator 48 outputs values for the time period from the previous back EMF zero-crossing point to the start of the most recent sampling period, bemfzc_to_sofs, and the time period from the previous back EMF zero-crossing point to the end of the most recent sampling period, bemfzc_to_eofs, with bemfzc_to_sofs and bemfzc_to_eofs output to the electrical period calculator 50, along with an indication of which phase was sampled, Ph_sampled, which in this case is phase A.

The mid-period angle of the sampling period relative to a previous zero-crossing of back EMf, mid_period_angle, can be calculated using the arcsin function dependent on the value of since:

sin φ≤1→arcsin(sin φ−1)=mid_period_angle sin φ>1→arcsin(sin φ−1)+90°=mid_period_angle A mid-period time, mid_period_time, is derived from the following:

$$\text{mid\_period\_time} = \text{mid\_period\_angle} \cdot \frac{T_{a\_old}}{360}$$

where $T_{a\_old}$ is a previously known or previously calculated electrical period. Then the time period from the previous back EMF zero-crossing point to the start of the most recent sampling period, bemfzc_to_sofs, and the time period from the previous back EMF zero-crossing point to the end of the most recent sampling period, bemfzc_to_eofs, are then calculated by:

$$\text{bemfZC\_to\_sofs} = \text{mid\_period\_time} - \frac{N}{2} \cdot T_s$$

$$\text{bemfZC\_to\_eofs} = \text{mid\_period\_time} + \frac{N}{2} \cdot T_s$$

with these values being passed to the electrical period calculator 50.

The electrical period calculator 50 calculates the electrical period between zero-crossings of back EMF induced in the phase winding 22 using the following:

$$Ta_{period} = \text{bemfZC\_to\_eofs}_{old} + \text{delta}T - \text{bemfZC\_to\_eofs}$$

where bemfZC_to_eofs$_{old}$ is a previously calculated time period from a previously calculated or known back EMF zero crossing to the end of a previous sampling period, and deltaT is given by deltaT=timer$_{endA}$−timer$_{endAold}$, where timer$_{endA}$ is the timer value at the end of sampling.

The electrical period calculator 50 outputs the calculated electrical period, Ta$_{period}$, and the time period from the previous back EMF zero-crossing point to the end of the most recent sampling period, bemfzc_to_eofs, which is also referred to as the phase delay, phaseAdelay, to the position signal generator 52, whilst also using the calculated rotor speed, given by $$\omega_a = \frac{2\pi}{Ta_{period}},$$

to index the 3D lookup table 38.

The position signal generator 52 generates the estimated rotor position signal $\theta_e$ using the following relationship:

$$\theta_e = \text{mod}\left(\frac{2\pi}{Ta_{period}} \cdot (t + \text{phase}A_{delay}), 2\pi\right)$$

where t is the running time which is reset to zero at the end of the sampling period, ie at timer$_{endA}$.

The estimated rotor position signal $\theta_e$ is referenced from a negative to a positive zero-crossing of the back EMF induced in phase winding A, with the estimated rotor position signal $\theta_e$ being passed to the voltage reference generator 40 to be used to control the motor 12 as discussed above.

Figure 3:
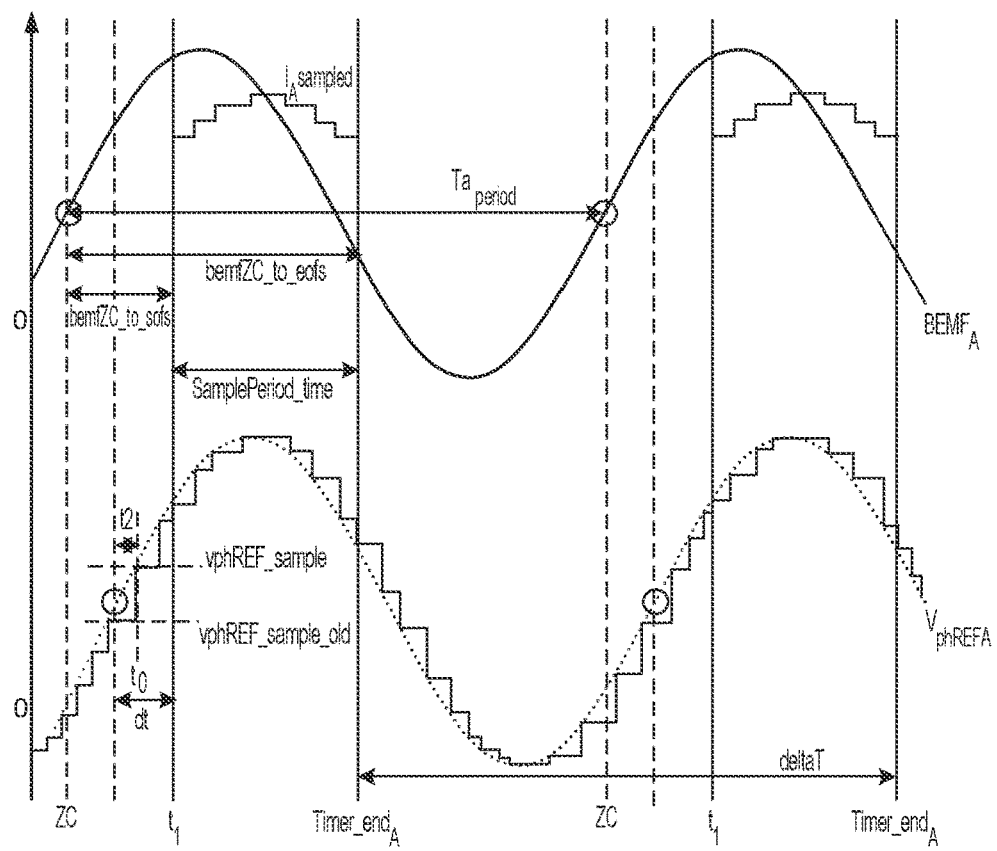
FIG. 3 is a first diagram illustrating waveforms utilised in controlling the motor system of FIG. 1.
Figure 4:
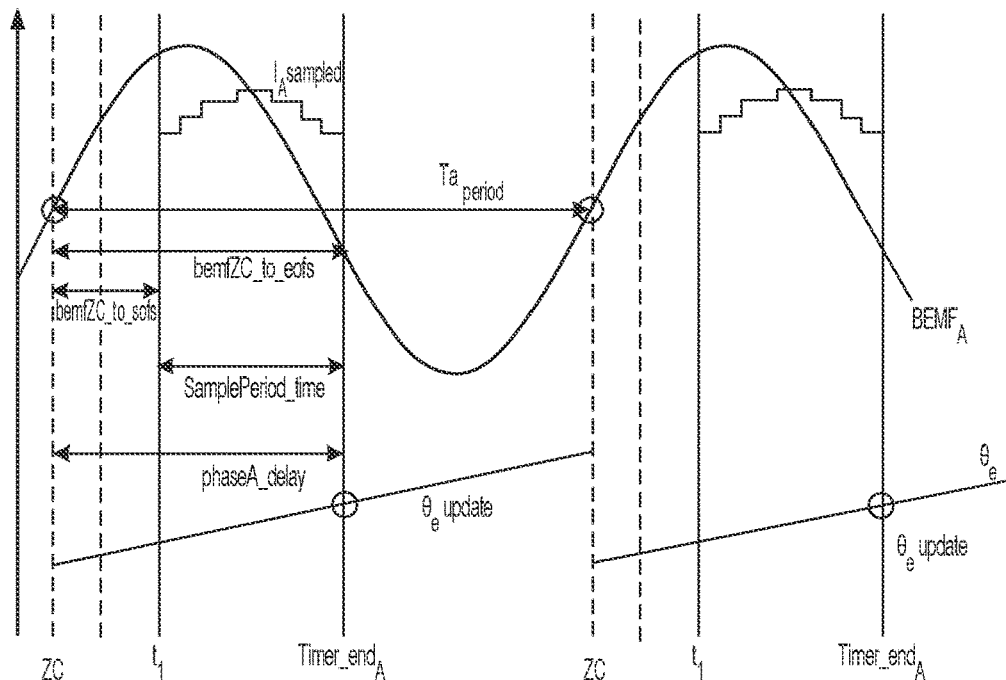
FIG. 4 is a second diagram illustrating waveforms utilised in controlling the motor system of FIG. 1.

In such a manner, the controller 34 may obtain an estimated rotor position signal $\theta_e$ in a sensorless manner, without requiring either a sensor or additional hardware components. The relationships between the various time periods discussed above can be seen in FIGS. 3 and 4.

In the embodiment of FIG. 1, only phase winding A is utilised in the generation of the estimated rotor position signal $\theta_e$, and the estimated rotor position signal $\theta_e$ is only updated once per electrical cycle, ie once every 360 electrical degrees.

From the discussion above, it can be seen that knowledge of the current value indicative of current flowing through the phase winding A is necessary for the generation of the estimated rotor position signal $\theta_e$, and hence that the current value indicative of current flowing through the phase winding A needs to be measured for a sufficient period of time to provide a desired accuracy in estimation of the position of the rotor 18. In the present embodiment, the current value indicative of current flowing through the phase winding A is measured for a full third of the electrical cycle, ie for 120 degrees. This is achieved via the current sensor 32 in FIG. 1, ie the shunt resistor R$_{shuntA}$, located on a low side of the leg A of the inverter 30 corresponding to switch Q2.

Taking this into consideration, it can be seen that a control scheme is needed where the switch Q2 is activated for a full third of the electrical cycle, ie for 120 degrees.

The controller 34 in the present case employs a five-step space vector pulse width modulation control scheme during the 120 degrees of the electrical cycle where it is required to measure the current using the shunt resistor R$_{shuntA}$. Such a five-step space vector pulse width modulation control scheme is illustrated with reference to FIGS. 5 and 6.

Figure 5:
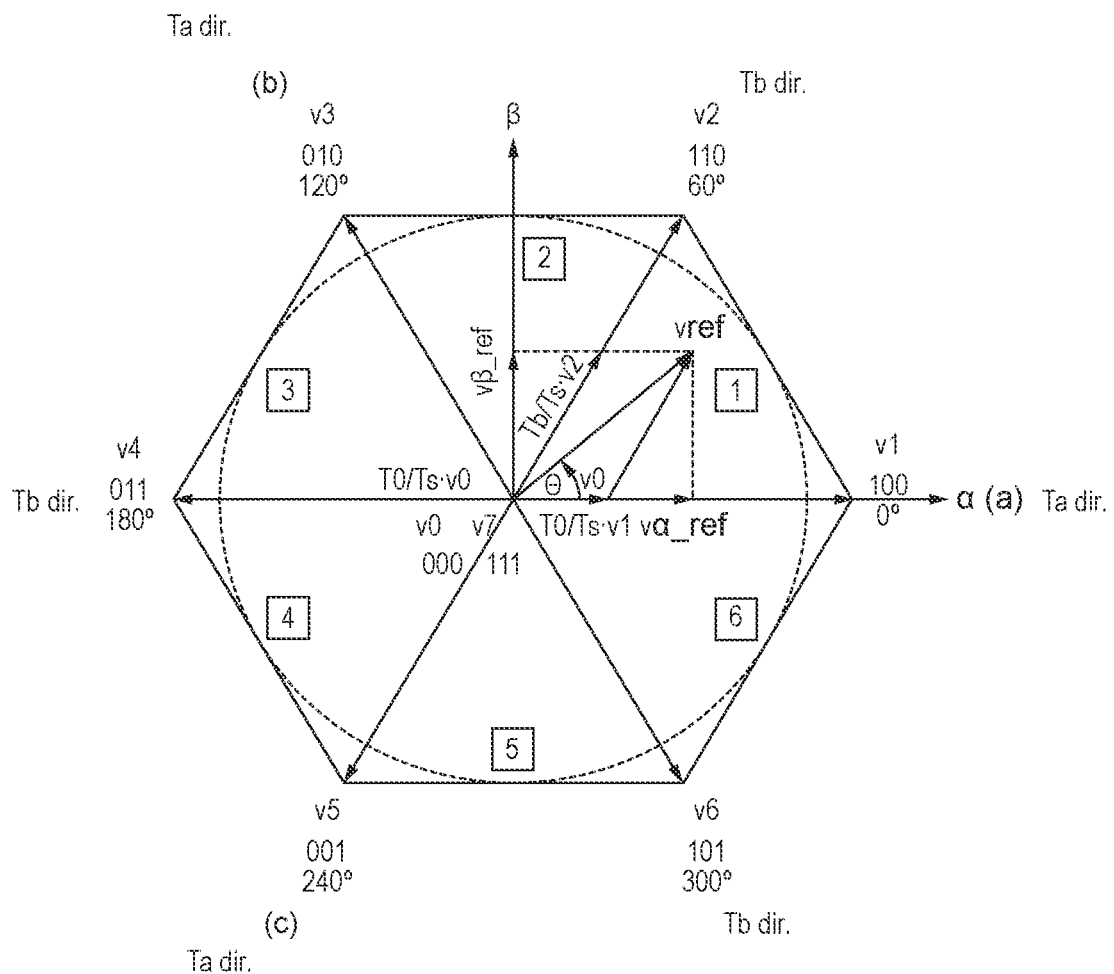
FIG. 5 is a schematic diagram illustrating voltage vectors used in control of the motor system of FIG. 1.

For traditional space vector pulse width modulation four voltage vectors are utilised over a 60 degree period of the electrical cycle, v0 (000), v7 (111) and the two voltage vectors neighbouring the reference voltage vector as defined by VREF$_{position}$ with a 0 indicating a low-side one of the corresponding six power switches Q1-Q6 conducting, and a 1 indicating a high-side one of the corresponding six power switches Q1-Q6 conducting. Thus, for example, for the voltage vector v1, the high-side switch corresponding to phase A is conducting, whilst the low-side switches for phase B and phase C are conducting, with this conventionally labelled as (100). One of the two voltage vectors neighbouring the reference voltage vector is changed every 60 degrees of the electrical cycle, thus resulting in use of a different switching cycles in different 60 degree segments of the electrical cycle. The different voltage vectors used in traditional space vector pulse width modulation are illustrated in FIG. 5.

Figure 6:
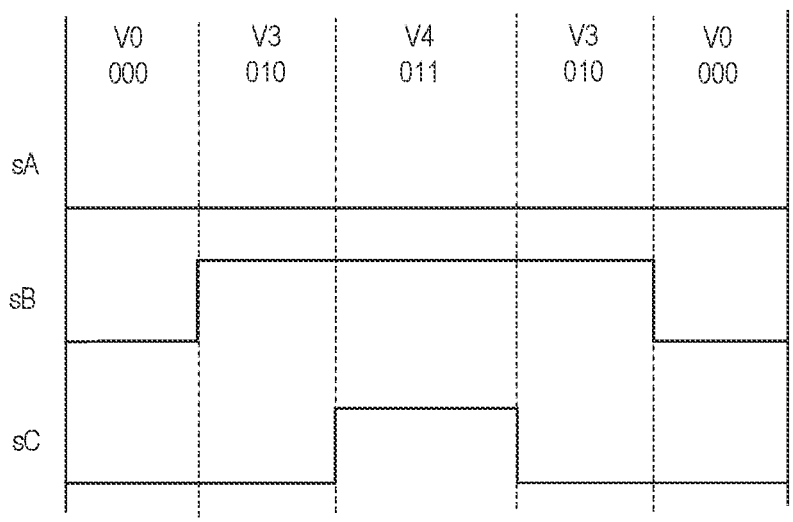
FIG. 6 is a schematic diagram illustrating five-step space vector pulse width modulation used in control of the motor system of FIG. 1.

In the 120 degrees of the electrical cycle during which it is desired to measure current flowing through the phase winding A, the controller 34 employs switching cycles that utilise five-step space vector pulse width modulation as illustrated in FIG. 6. Five-step space vector pulse width modulation differs to the traditional space vector pulse width modulation described above, in that three voltage vectors are used rather than four, with the zero-voltage vector v7 (111) omitted. In the switching cycle embodiment depicted in FIG. 6, the three voltage vectors used are v0 (000), v3(010) and v4 (011). Thus it can be seen that for the five-step space vector pulse width modulation illustrated in FIG. 6, the low-side switch Q2 is on during application of each of the voltage vectors v0 (000), v3(010) and v4 (011). The voltage vectors v0 (000), v3(010) and v4 (011) are applied in a sequence over a switching cycle, with only a single switch changing state between adjacent applied voltage vectors. For example, as seen in FIG. 6, the sequence of applied voltage vectors is v0, v3, v4, v3, v0.

The switching cycle illustrated in FIG. 6 is repeated several times through the 60 degree portion of the electrical cycle during which it is desired to monitor the current flowing through phase winding A, along with another five-step space vector pulse width modulation switching cycle that utilises the voltage vectors v0 (000), v4(011) and v5 (001), which also shares the common feature of the low-side switch Q2 being turned on during application of each of the voltage vectors, being applied for a further 60 degree portion of the electrical cycle.

By employing the five-step space vector pulse width modulation described above, the current flowing through phase winding A can be monitored through 120 degrees of the electrical cycle to enable use of the method 100 of determining the position of the rotor 18 previously described.

Figure 7:
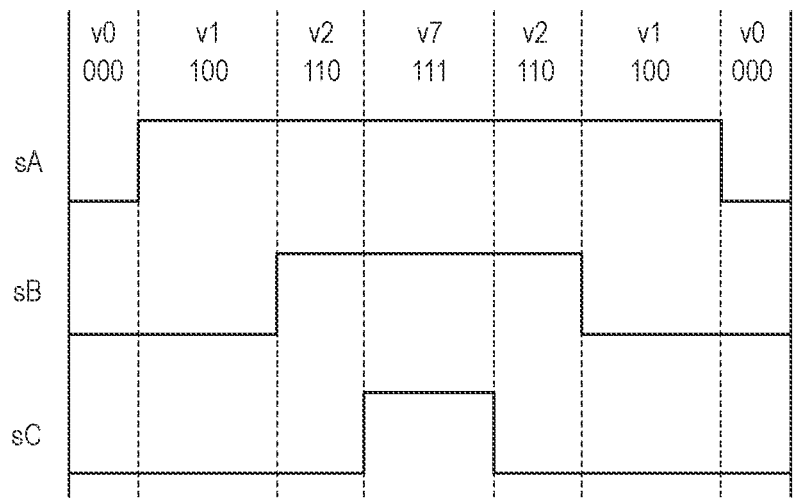
FIG. 7 is a schematic diagram illustrating seven-step space vector pulse width modulation used in control of the motor system of FIG. 1.

If five-step space vector pulse width modulation were to be used for the full electrical cycle, ie for 360 degrees of the electrical cycle, then the effective switching frequency would be reduced compared to a control scheme that utilises traditional space vector pulse width modulation with four voltage vectors, ie so-called seven-step space vector pulse width modulation, which is illustrated in FIG. 7 in relation to a switching cycle that utilises v0 (000), v1(100), v2 (110), and v7 (111). Indeed, the effective switching frequency for five-step space vector pulse width modulation is two thirds the effective switching frequency for seven-step space vector pulse width modulation.

It has been observed by the applicant that use of five-step space vector pulse width modulation compared to seven-step space vector pulse width modulation may result in increased peak-to-peak current ripple, which leads to higher eddy currents induced in the permanent magnet of the rotor 18, and hence increased magnet temperature and increased rotor losses.

Given that the 5-step space vector pulse width modulation only needs to be applied for 120 degrees of the electrical cycle to obtain the current measurements needed for the method 100 of estimating the position of the rotor 18 discussed above, the controller 34 of the present invention implements five-step space vector pulse width modulation for 120 degrees of the electrical cycle, and then implements seven-step space vector pulse width modulation in the remaining 240 degrees of the electrical cycle.

As can be seen from the example switching cycle of FIG. 7, during seven-step space vector pulse width modulation for one 60 degree period of the electrical cycle, the voltage vectors v0 (000), v1(100), v2 (110) and v7 (111) are used. It will be apparent that the zero-voltage vector v7 (111) is a voltage vector which is applied by turning on all high-side switches Q1, Q3, Q5, and turning off all low-side switches Q2, Q4, Q7. The voltage vectors v0 (000), v1(100), v2 (110), and v7 (111) are applied in a sequence over a switching cycle, with only a single switch changing state between adjacent applied voltage vectors. For example, as seen in FIG. 7, the sequence of applied voltage vectors is v0, v1, v2, v7, v2, v1, v0. The switching cycle of FIG. 7 may be repeated over a 60 degree portion of the electrical cycle, along with switching cycles that utilise both zero-voltage vectors v0 (000) and v7 (111) in conjunction with respective pairs of adjacent voltage vectors v2 (110) and v3 (010), v5 (001) and v6 (101) and v6 (101) and v1 (100) also being applied for respective 60 degree portions of the electrical cycle. By applying this larger set of voltage vectors that include the zero-voltage vector v1 (111) for 240 degrees of the electrical cycle where a measurement of the current flowing through the phase winding A is not needed for the method 100 described above, rotor losses and rotor temperature can be reduced.

Figure 8:
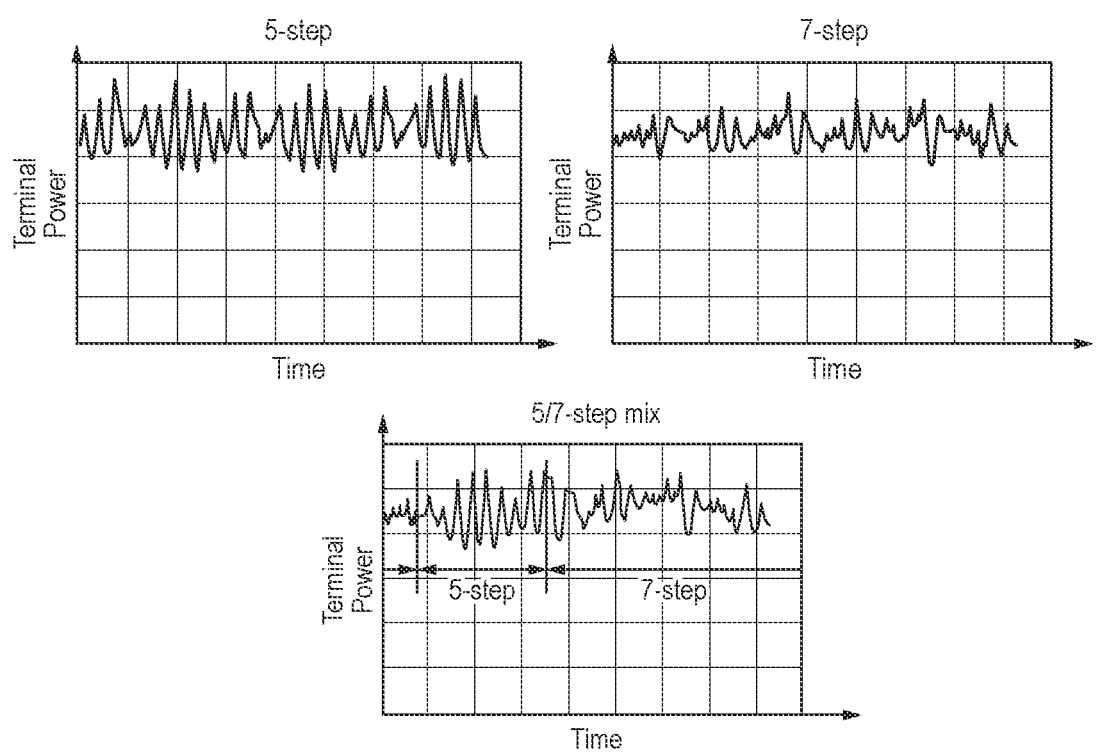
FIG. 8 illustrates relationships between terminal power and time for five- and seven-step space vector pulse width modulation.

A plot of terminal power over time for both five-step and seven-step space vector pulse width modulation, as well as for the hybrid five- and seven-step space vector pulse width modulation employed by the controller 34 of the present invention, is shown in FIG. 8. From this plot, the benefits in terms of reduced peak-to-peak current ripple discussed herein can be deduced.

Although discussed above in relation to the need to measure current flowing through phase winding A to implement the method 100, it will be appreciated that phase B or phase C could also be utilised, with the positioning of the shunt resistor used as a current sensor 32 and the voltage vectors applied using five-step space vector pulse width modulation being modified accordingly. Equally, it will be appreciated that where two phases are used to estimate the position of the rotor 14, two shunt resistors may be required, and hence that five-step space vector pulse width modulation may be required for 240 degrees of the electrical cycle, with seven-step space vector pulse width modulation applied for the remaining 120 degrees of the electrical cycle.

The invention claimed is:

1. A brushless permanent magnet motor comprising:
   a phase winding, an inverter for applying voltage vectors to the phase winding, and a controller for controlling the inverter, wherein the inverter comprises a plurality of high side switches and a plurality of low side switches, and the controller is configured to:
   divide an electrical cycle of the motor into a first portion and a second portion different to the first portion,
   apply a first set of voltage vectors to the phase winding in the first portion of the electrical cycle,
   apply a second set of voltage vectors to the phase winding in the second portion of the electrical cycle, the second set of voltage vectors different to the first set of voltage vectors,
   in the first portion of the electrical cycle, turn on a low side switch of the plurality of low side switches, to apply each voltage vector of the first set of voltage vectors,
   in the first portion of the electrical cycle, estimate a position of a rotor of the brushless permanent magnet motor using a determined current value indicative of current flowing through the phase winding, and
   in the second portion of the electrical cycle, turn off all low side switches to apply a zero-voltage vector of the second set of voltage vectors.

2. The brushless permanent magnet motor as claimed in claim 1, wherein the controller is configured to turn on all low side switches to apply a zero-voltage vector of the first set of voltage vectors.

3. The brushless permanent magnet motor as claimed in claim 1, wherein the controller is configured to turn on all low side switches to apply a further zero-voltage vector of the second set of voltage vectors.

4. The brushless permanent magnet motor as claimed in claim 1, wherein the second set of voltage vectors comprises more voltage vectors than the first set of voltage vectors.

5. The brushless permanent magnet motor as claimed in claim 1, wherein the controller is configured to apply the first set of voltage vectors in a first sequence and to apply the second set of voltage vectors in a second sequence, the first sequence comprising a non-zero voltage vector applied at a mid-point of the first sequence, and the second sequence comprising the zero-voltage vector applied at a mid-point of the second sequence.

6. The brushless permanent magnet motor as claimed in claim 1, wherein the brushless permanent magnet motor comprises a three-phase brushless permanent magnet motor having three phase windings, and the inverter comprises a three-phase inverter having three high side switches and three low side switches.

7. The brushless permanent magnet motor as claimed in claim 1, wherein the controller employs five-step space vector pulse width modulation to apply the first set of voltage vectors in the first portion of the electrical cycle, and employs seven-step space vector pulse width modulation to apply the second set of voltage vectors in the second portion of the electrical cycle.

8. The brushless permanent magnet motor as claimed in claim 1, wherein the first portion of the electrical cycle comprises 120 degree of the electrical cycle, and the second portion of the electrical cycle comprises 240 degrees of the electrical cycle.

9. The brushless permanent magnet motor as claimed in claim 1, wherein the brushless permanent magnet motor comprises a resistor connected in series with the low side switch turned on to apply each voltage vector of the first set of voltage vectors, and the controller is configured to monitor the voltage across the resistor in the first portion of the electrical cycle to determine the current value indicative of current flowing through the phase winding in the first portion of the electrical cycle using the monitored voltage.

10. The brushless permanent magnet motor as claimed in claim 1, wherein the controller is configured to obtain a reference voltage value indicative of a voltage applied to the phase winding of the motor, calculate a phase of back EMF induced in the phase winding using the determined current value and the reference voltage value, determine a zero-crossing point of the back EMF induced in the phase winding using the calculated phase of back EMF induced in the phase winding, and generate a rotor position signal based on the determined zero-crossing point.

11. The brushless permanent magnet motor as claimed in claim 10, wherein the phase of back EMF induced in the phase winding is calculated using the equation:

$$-E_{phX} \propto I_{phX}R_{phX} + (L_{selfphX} - L_{mutualphX})\frac{dI_{phX}}{dt} - V_{phX};$$

where $E_{phX}$ is the back EMF induced in the phase winding X, $L_{selfphX}$ is the self-inductance of the phase winding X, $L_{mutualphX}$ is the s mutual inductance of the phase winding X with other phase windings of the motor, $I_{phX}$ is the current value indicative of current flowing through the phase winding X, $R_{phX}$ is the resistance of the phase winding X, and $V_{phX}$ is the reference voltage value indicative of the voltage applied to the phase winding X.

12. The brushless permanent magnet motor as claimed in claim 10, wherein determining a zero-crossing point of the back EMF induced in the phase winding comprises utilising any of a calculated phase of back EMF induced in the phase winding, an amplitude representative of the amplitude of back EMF induced in the phase winding, and a frequency representative of the frequency of back EMF induced in the phase winding.

13. The brushless permanent magnet motor as claimed in claim 10, wherein calculating a phase of back EMF induced in the phase winding comprises integrating the equation:

$$-E_{phX} \propto I_{phX}R_{phX} + (L_{selfphX} - L_{mutualphX})\frac{dI_{phX}}{dt} - V_{phX};$$

to obtain a relationship representative of integrated back EMF.

14. The brushless permanent magnet motor as claimed in claim 13, wherein calculating a phase of back EMF induced in the phase winding comprises equating integrated back EMF to an integral of a sinusoidal waveform representative of back EMF induced in the phase winding.

15. The brushless permanent magnet motor as claimed in claim 10, wherein the controller is configured to utilise a determined zero-crossing point of back EMF induced in the phase winding to calculate an electrical period of the rotor.

16. The brushless permanent magnet motor as claimed in claim 10, wherein the controller is configured to utilise a determined zero-crossing point of back EMF induced in the phase winding to calculate a speed of the rotor.

17. The brushless permanent magnet motor as claimed in claim 10, wherein the controller is configured to utilise a determined zero-crossing point of back EMF induced in the phase winding to generate a signal representing continuous position of the rotor.

18. A method of controlling a brushless permanent magnet motor comprising a phase winding and an inverter for applying voltage vectors to the phase winding, the inverter comprising a plurality of high side switches and a plurality of low side switches, wherein the method comprises:
dividing an electrical cycle of the motor into a first portion and a second portion different to the first portion,
applying a first set of voltage vectors to the phase winding in the first portion,
applying a second set of voltage vectors to the phase winding in the second portion, the second set of voltage vectors different to the first set of voltage vectors,
turning on, in the first portion of the electrical cycle, a low side switch to apply each voltage vector of the first set of voltage vectors,
estimating, in the first portion of the electrical cycle, a position of a rotor of the brushless permanent magnet motor using a determined current value indicative of current flowing through the phase winding, and
turning off, in the second portion of the electrical cycle, all low side switches to apply at least one voltage vector of the second set of voltage vectors.

19. A data carrier comprising machine readable instructions for the operation of a controller of a brushless permanent magnet motor to:
divide an electrical cycle of the motor into a first portion and a second portion different to the first portion,
apply a first set of voltage vectors to a phase winding of the motor in the first portion,
apply a second set of voltage vectors to the phase winding in the second portion, the second set of voltage vectors different to the first set of voltage vectors,
in the first portion of the electrical cycle, turn on a low side switch to apply each voltage vector of the first set of voltage vectors,
in the first portion of the electrical cycle, estimate a position of a rotor of the brushless permanent magnet motor using a determined current value indicate of current flowing through the phase winding, and
in the second portion of the electrical cycle, turn off all low side switches to apply at least one voltage vector of the second set of voltage vectors.

* * * * *